(12) United States Patent
Ranadive et al.

(10) Patent No.: US 9,858,405 B2
(45) Date of Patent: Jan. 2, 2018

(54) SYSTEMS AND METHODS FOR AUTHENTICATING A USER BASED ON A COMPUTING DEVICE

(71) Applicant: PAYPAL, INC., San Jose, CA (US)

(72) Inventors: Abhijeet Arvind Ranadive, San Jose, CA (US); Michael Mettler, San Francisco, CA (US); Thomas Whipple, San Jose, CA (US); Benjamin Mills, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 192 days.

(21) Appl. No.: 14/306,036

(22) Filed: Jun. 16, 2014

(65) Prior Publication Data

US 2015/0363581 A1 Dec. 17, 2015

(51) Int. Cl.
*G06F 21/44* (2013.01)
*G06F 21/34* (2013.01)

(52) U.S. Cl.
CPC ...................... *G06F 21/34* (2013.01)

(58) Field of Classification Search
CPC ............. H04L 63/0876; H04L 63/0807; H04L 63/0853; G06F 21/34; G06F 21/44; G06Q 20/3227
See application file for complete search history.

(56) References Cited

U.S. PATENT DOCUMENTS

| 6,510,236 B1 * | 1/2003 | Crane ..................... G06F 21/32 382/116 |
| 2013/0086669 A1 | 4/2013 | Sondhi et al. |
| 2013/0263285 A1 | 10/2013 | Lester et al. |
| 2013/0340052 A1 | 12/2013 | Jakobsson |

FOREIGN PATENT DOCUMENTS

WO    WO 2013/189934    12/2013

* cited by examiner

*Primary Examiner* — Matthew Smithers
*Assistant Examiner* — Paul Callahan
(74) *Attorney, Agent, or Firm* — Haynes and Boone, LLP

(57) ABSTRACT

A system and/or method may be provided to silently authenticate a user. An example method of silently authenticating a user includes receiving a set of device characteristics from a user device and identifying, based on the set of device characteristics, the user device. The method also includes determining whether to trust the user device and determining whether the user device is associated with a user that was previously authenticated. The method further includes in response to determining to trust the user device and that the user device is associated with the user that was previously authenticated, authenticating the user based on the previous authentication.

20 Claims, 10 Drawing Sheets

SYSTEMS AND METHODS FOR AUTHENTICATING A USER BASED ON A COMPUTING DEVICE

BACKGROUND

Field of the Invention

The present disclosure generally relates to systems and methods for authenticating a user in association with a computing device.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal®, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. An online or mobile payment process utilizing the payment application typically includes user authentication that requires a user to enter a login identifier (ID) and/or a password to authenticate the user. Nevertheless, the authentication process may cause inconvenience to the user especially if the user is in a hurry or if a keyboard is not included with the mobile device for the user to type in the login ID or password. As such, the authentication process may delay the overall payment process and cause the payment process to take longer than making a payment with cash, which can discourage the use of online or mobile payments. Therefore, there is a need for a system or a method that implements an easier authentication process on mobile devices.

Figure 1:
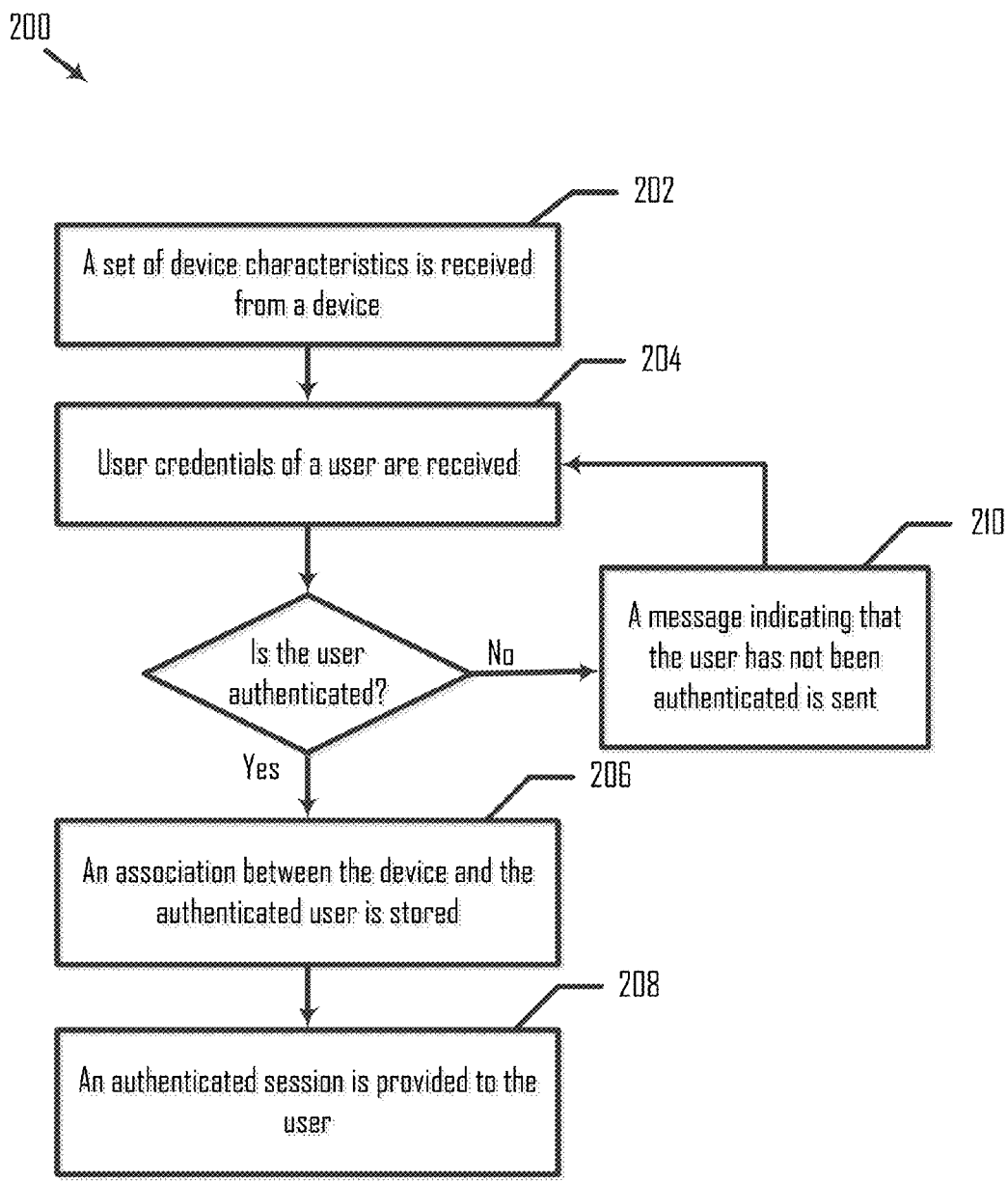
FIG. 1 is a flowchart illustrating an embodiment of a method of associating a user device with a user.

Embodiments of the present disclosure and their advantages are best understood by referring to the detailed description that follows. It should be appreciated that reference numerals are used to identify like elements illustrated in one or more of the figures, wherein showings therein are for purposes of illustrating embodiments of the present disclosure and not for purposes of limiting the same.

DETAILED DESCRIPTION

I. Overview
II. Example Methods
  A. Associate the Device with the User
    1. Extract Set of Device Characteristics
    2. Authenticate the User
  B. Subsequent User Authentication
    1. Establish Trust with the Device
    2. Establish Trust with the User
      a. Silent Authentication
      b. Explicit Authentication
III. Example System Architecture
IV. Example Computing Systems

I. Overview

According to an embodiment, a system and/or method may be provided to silently authenticate a user via a user device (e.g., a mobile phone device, a mobile tablet device, and/or a variety of other user devices known in the art). In particular, a user may provide their user credentials through the user device, and the user device may send the user credentials over a network to be stored at a server that is remote from the user device. The user may then be authenticated or logged into various applications (apps) and/or websites without needing to enter their user credentials each time they wish to access those applications and/or websites, and a payment service provider, such as PayPal®, Inc. of San Jose, Calif., may receive requests from the user through those applications and/or websites access using their user device.

In an example, a payment provider server that is maintained by the payment service provider may authenticate a user without the user being prompted to enter their authentication credentials. As discussed in detail below, the payment provider server may authenticate the user based on determining that the device being used by the user to access the payment provider server is a trusted device and that the device is associated with a previously authenticated user. The payment provider server may then provide the user device with an authentication token that is used to make calls to the payment service provider's application programming interface (API) to silently authenticate the user. As such, the user is authenticated for one or more subsystems provided on the user device without the need to manually enter conventional authentication credentials.

Unless specifically stated otherwise, as apparent from the following discussion, it is appreciated that throughout the description, discussions utilizing terms such as "receiving", "sending", "storing", "providing", "determining", and "authenticating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In an embodiment, a Software Development Kit (SDK) includes a set of tools and platform components (e.g., set of software libraries) for developers to develop, build, test, debug, and optimize their applications, and manage the platform component installation. The SDK may also provide easy ways to integrate with the build and development environments. In an example, the SDK is Paypal Touch®, available from PayPal® Inc., of San Jose, Calif., and the payment service provider is PayPal®, Inc. of San Jose, Calif. However, a variety of entities may provide the SDK and operate as the payment service provider (or other system provider) while remaining within the scope of the present disclosure.

A merchant application provided on a user device may execute to identify products and/or services (e.g., collectively referred to as items) that are provided by the merchant and that may be made available for viewing and purchase by a user. The SDK may be provided by a payment service provider to the merchant that maintains the merchant application. The merchant may incorporate the SDK into the merchant application during the building of the application. In an example, if a user downloads the merchant application on a user device, the SDK may also be downloaded with (or as part of) the merchant application on the user device. As such, when the user selects the merchant application by, for example, selecting an icon associated with the merchant application, the merchant application (along with the SDK) is launched. In another example, the SDK may be part of an application that is trusted by the payment provider server and that interacts with the merchant application on the user device. In such an example, the user may download the SDK independent of the merchant application and provide it on the user device.

The SDK communicates with a payment provider server operated by the payment service provider and sends information to and receives information from the payment provider server. In an example, the SDK and the payment provider server may communicate with each other to authenticate the user.

A networked system may silently authenticate the user by establishing that the user device is a trusted device and has been used by a previously authenticated user. In an example, the networked system silently authenticates the user by associating a user device with an authenticated user.

The user device may include a plurality of merchant applications, each of which may incorporate the SDK from the payment service provider. After the payment provider server authenticates the user once based on the user's provided user credentials, the payment provider server may store the user's user credentials and store an association between the user device and the previous authentication of the user. Based on that association, if the user selects any of the other applications on the user device that incorporate the SDK, the payment provider server may silently authenticate the user without requiring the user to enter authentication credentials and, in some embodiments, without the user even launching that other application. The communications between the SDK and the payment provider server may provide the user with the convenience of only having to provide their user credentials once on the user device, and then being able to access the payment provider server to pay for a transaction in association with any merchant that has incorporated the SDK into their merchant's application.

II. Example Methods

FIG. 1 is a flowchart illustrating an embodiment of a method 200 of associating a user device with a user. Method 200 is not meant to be limiting and may be used in other applications other than the payment applications discussed below. Method 200 includes blocks 202-210.

A. Associate the Device with the User

1. Extract Set of Device Characteristics

In a block 202, a set of device characteristics is received from a user device. In an example, a payment provider server receives, e.g., using one or more hardware processors included in the payment provider service, a set of device characteristics from the user device. In an embodiment, the one or more device characteristics may be included in a parameter in a call to the payment provider server.

In an embodiment, the SDK has the functionality to extract a set of device characteristics from the user device. For example, the SDK may extract the set of device characteristics by, for example, invoking application programming interfaces (APIs) at the user device. The SDK may extract the set of device characteristics when, for example, a merchant application is downloaded on the user device. The SDK may also extract the set of device characteristics in response to the user selecting merchant application or periodically when a period of time elapses. The SDK sends the set of device characteristics over a network (e.g., the Internet) to a payment provider server to store in a payment database.

The set of device characteristics may include technical details (e.g., number of processors executing on the user device) and context information (e.g., geographic location) of user device 110 that is attempting to access a service of the payment provider server. In an example, the device characteristics may include "an_id", which may include an anonymous identifier obtained from an application programming interface (API). The API may be invoked for device identification, authentication, user and device association, and payment processing, as will be explained further below.

In another example, the device characteristics may include an "app_guid", which may include a unique installation identifier for the application that may change if the user uninstalls the merchant application or wipes the device. In another example, the device characteristics may include an "app_id", which may include an identifier of the application that interacts with the payment provider server. In another example, the device characteristics may include an "app_version", which may include a version number of a payment application installed on the user device.

In another example, the device characteristics may include a "base_station_id", which may include the base station identification number for code division multiple access (CDMA) phones. In another example, the device characteristics may include a "bssid", which may include the media access control (MAC) address of the Wi-Fi access point to which the user's device is currently connected (if any). In another example, the device characteristics may include a "cell_id", which may include the identifier of the current cell site for Global System for Mobiles (GSM) phones. In another example, the device characteristics may include a "cir_version", which may include the version of the Common Language Runtime on the phone. In another example, the device characteristics may include a "comp_version", which may include the version of the number of the component that is recording, modeling, and making decisions based on the set of device characteristics. In another example, the device characteristics may include a "conf_url", which may include the uniform resource locator (URL) of the configuration file used. In another example, the device characteristics may include a "conf_version", which may include the version number of the configuration file used.

In another example, the device characteristics may include a "conn_type", which may include the type of the current network connection. In such an example, if the user device is executing iOS®, the type of current network connection may be "wifi" or "cellular". Additionally, if the user device is executing Android®, the type of current network connection may be "WIFI" or "MOBILE". In another example, the device characteristics may include a "device_firmware_version", which may include the firmware version running on the device. In another example, the device characteristics may include a "device_id", which may include the device identifier (ID) as reported by the operation system (OS). In such an example, if the user device is a GSM phone, the device_id may be IMEI, and if the user device is a CDMA phone, the device_id may be MEID.

In another example, the device characteristics may include a "device_model", which may include the phone model. In another example, the device characteristics may include a "device_name", which may include the user-supplied name of the device. In another example, the device characteristics may include a "device_uptime", which may include the time since last reboot of the OS (e.g., in milliseconds). In another example, the device characteristics may include a "dongle_device_id", which may include the ID of a dongle (e.g., swiper) that is attached to the user device. In an embodiment, a dongle may include a small device that may be connected to and used with the user device to, for example, allow access to wireless broadband, allow the use of protected software, and/or provide a variety of other dongle functionality known in the art. In another example, the device characteristics may include an "email_configured", which indicates whether an email account is set up on the device. In another example, the device characteristics may include an "emulator", which indicates whether the merchant application is running on an emulator.

In another example, the device characteristics may include an "error", which may be useful for fixing bugs. In such an example, the "error" parameter may be present if an internal error occurs on the SDK. In another example, the device characteristics may include an "ip_addrs", which is the internet protocol (IP) of the user device. In another example, the device characteristics may include a "keyboard_present", which indicates whether the user device has a physical hardware keyboard. In another example, the device characteristics may include a "known_apps", which indicates a list of applications that are currently installed on the user device (e.g., from a set list to check). In another example, the device characteristics may include a "line_1_number", which may include the device phone number (e.g., MSISDN) as is reported by the OS. In another example, the device characteristics may include a "linker_id", which may include the linker ID that has been assigned to the user device. The linker_id may be shared across applications.

In another example, the device characteristics may include a "license_accepted", which indicates whether the user has accepted the license of the host application. In such an example, if the user has not accepted the license of the host application, the SDK may determine to not send the device ID to the payment provider server. In another example, the device characteristics may include a "locale_country", which includes the country code for the locale to which the device is set. In another example, the device characteristics may include a "locale_lang", which includes the language code for the locale to which the device is set. In another example, the device characteristics may include a "location", which includes the location of the device and may include the latitude, longitude, accuracy, and timestamp of when the information was collected. In another example, the device characteristics may include a "location_area_code", which the GSM location area code of the current cell site. In another example, the device characteristics may include a "location_auth_status", which indicates whether the merchant application has been granted location permissions. In another example, the device characteristics may include a "mac_addrs", which includes the MAC address of the user device. In another example, the device characteristics may include a "mobile_operator_name", which includes the original operator name of the user device from an API installed on the device.

In another example, the device characteristics may include a "notif_token", which includes a token that is given to the user device. In an example, the token is associated with an Apple® Push Notification Service (APNS). In another example, the device characteristics may include an "os_platform", which includes the OS platform. In another example, the device characteristics may include an "os_type", which includes the OS currently running on the user device. The OS may be, for example, "iOS" or "Android". In another example, the device characteristics may include an "os_version", which includes the currently installed version of the OS running on the user device. In another example, the device characteristics may include a "payload_type", which includes the payload type. In an example, the SDK may send a full update including all data elements collected by the SDK. In such an example, the "payload_type" may be full. In another example, the SDK may send an incremental update including data elements that have changed since the SDK's last data collection. In such an example, the "payload_type" may be incremental.

In another example, the device characteristics may include a "phone_type", which includes the phone type of the user device. In such an example, the "phone_type" parameter indicates the type of radio used to transmit voice calls (e.g., "GSM", "CDMA", or "none"). In another example, the device characteristics may include a "pin_lock_last_timestamp", which includes the last time at which the user device was known to be locked using a pincode. In another example, the device characteristics may include a "power_source", which includes the original mobile operator name from an API installed on the user device. In another example, the device characteristics may include a "risk_comp_session_id", which includes SDK's session ID. A new session ID may be generated every time a full update is created and sent. In another example, the device characteristics may include "roaming", which indicates whether the user device is currently roaming.

In another example, the device characteristics may include "roaming_possible", which indicates whether the network allows data roaming. In another example, the device characteristics may include a "sim_operator_name", which includes service provider name (SPN). In another example, the device characteristics may include a "sim_serial_number", which includes the serial number of the SIM (if applicable) in the user device. In another example, device characteristics may include "sms_enabled", which indicates whether text message is enabled on the user device. In another example, the device characteristics may include an "ssid", which includes the SSID (network name) of the Wi-Fi network to which the user device is currently connected (if any). In another example, the device characteristics may include a "subscriber_id", which includes the unique subscriber ID (e.g., International Mobile Station Identity (IMSI) for a GSM phone). In another example, the device characteristics may include a "timestamp", which includes the timestamp of the creation time of the SDK binary large object (BLOB). In such an example, the timestamp may be a Unix® timestamp.

In another example, the device characteristics may include a "total_device_memory", which includes the physical RAM size of the device in bytes. In another example, the device characteristics may include a "total_storage_space", which includes the total size of the storage available on the user device. In another example, the device characteristics may include a "tz_name", which includes the name of the timezone to which the user device is set as reported by the OS. In another example, the device characteristics may include a "advertising_identifier", which includes an identifier that is shared across all application on the user device and is visible to all applications. In such an example, the advertising identifier is not deleted if the application is uninstalled, but may be removed manually by the user. In another example, the device characteristics may include a "vendor_identifier", which includes the identifier that is shared by all applications from the same vendor (e.g., Team ID) and is invisible to all other applications. In such an example, the "vendor_identifier" may be deleted when the last application from the vendor is removed, but is not deleted/changed by the user in any other way.

In another example, the device characteristics may include a "network_operator", which includes a specific field for an OS type (e.g., iOS or Android) for the numeric name (e.g., Mobile Country Code (MCC)+Mobile network Code (MNC)) of the current registered operator. The "network_operator" parameter may be available when the user is registered to a network. In another example, the device characteristics may include a "cdma_network_id", which includes the CDMA network identification number. In such an example, the "cdma_network_id" parameter may be a specific field for an OS type (e.g., (e.g., iOS or Android). In another example, the device characteristics may include a "cdma_system_id", which includes the CDMA system identification number. In such an example, the "cdma_system_id" parameter may be a specific field for an OS type (e.g., (e.g., iOS or Android). In another example, the device characteristics may include a "is_emulator", which indicates whether the user device is suspected of being an emulator and not a real mobile device. In another example, the device characteristics may include a "is_rooted", which indicates whether the user device is suspected of being jailbroken or rooted.

In another example, the device characteristics may include a "geo_country", which includes the country in which the login took place. The longitude and/or latitude may be converted to a country code in the backend and may be available for flows going through Risk Configuration & Metadata Service (RCMD) or Risk Authentication Service (RAS). In another example, the device characteristics may include a "source_app", which indicates where the host applications come from. The "source_app" may be, for example, "unknown(0)", "paypal(10)", etc. In another example the device characteristics may include a "source_app_version", which includes the version of the host application. In another example, the device characteristics may include a "pairing_id", which includes a 32-byte string to pair the payload and payment context. In another example, the device characteristics may include a "app_first_install_time", which includes a timestamp that represents when the application was first installed. In another example, the device characteristics may include a "all_last_update_time", which includes a timestamp that represents when the application was last updated. While several examples of device characteristics have been provided, one of skill in the art in possession of the present disclosure will recognize that a wide variety of devices characteristics will fall within the scope of the present disclosure.

2. Authenticate the User

In a block 204, user credentials of a user are received. In an example, the user is using the user device to access a payment application that is installed on the user device, enters user credentials for the payment application into the user device, and the payment provider server receives the user credentials of the user over a network from the user device. The SDK may provide the user with a login prompt requesting the user's user credentials on a display of the user device, and the user may enter in their user credentials on the user device using an input device such as a physical or virtual keyboard, number pad, and/or other credential provision device known in the art. The SDK may receive the user credentials and send the user credentials to the payment provider server to authenticate the user. The user credentials may include, for example, a username and password.

The payment provider server may include a user authenticator. In an example, the user authenticator receives the user credentials provided by the user and sent by the SDK and authenticates the user by determining whether the received user credentials are stored in a payment database (e.g., in a record in user accounts). In such an example, the user authenticator may determine whether the received user credentials match user credentials in a record in the user accounts. In another example, the user authenticator authenticates the user based on determining that the user is creating a user account with the user credentials.

If the user accounts do not store information about the user, the user authenticator may store the user credentials into the user accounts. The user accounts may not store information about the user because, for example, this is the first time the user has attempted to access a service provided by the payment provider server and does not yet have an account with the payment provider server. Additionally, the user may have an account already with the payment provider server but is setting up another account with the payment provider server.

In an example, in response to determining that the received user credentials match the user credentials in a record in the user accounts, the user authenticator authenticates the user. In a block 206, if the user has been authenticated, an association between the device and the authenticated user is stored. In an example, in response to the user being authenticated, the user authenticator stores in the payment database an association between the user device and the authenticated user. Accordingly, the next time the user uses the same user device to access services provided by the payment provider server, the user authenticator may be able to authenticate the user based on the stored association between the user device and the authenticated user.

In a block 208, if the user has been authenticated, an authenticated login session is provided to the user. In an example, in response to the user being authenticated, the payment provider server provides an authenticated session to the user. As such, the user is able to access services provided by the payment provider server.

In an example, in response to determining that the received user credentials do not match user credentials in any records in the user accounts, the user authenticator does not authenticate the user. In a block 210, if the user is determined to not be an authenticated user, a message indicating that the user has not been authenticated is sent. In an example, the user authenticator sends a message indicating that the user has not been authenticated to the user device. The SDK may receive the message and again provide the user with a login prompt requesting the user's user credentials on a display of the user device. The SDK may send the user credentials to the payment provider server to authenticate the user. From block 210, process flow may proceed to block 204, where user credentials of a user are received at the payment provider server.

It should be understood that additional processes may be performed before, during, or after blocks 202-210 discussed above. It is also understood that one or more of the blocks of method 200 described herein may be omitted, combined, or performed in a different sequence as desired.

B. Subsequent User Authentication

1. Establish Trust with the Device

Figure 2A:
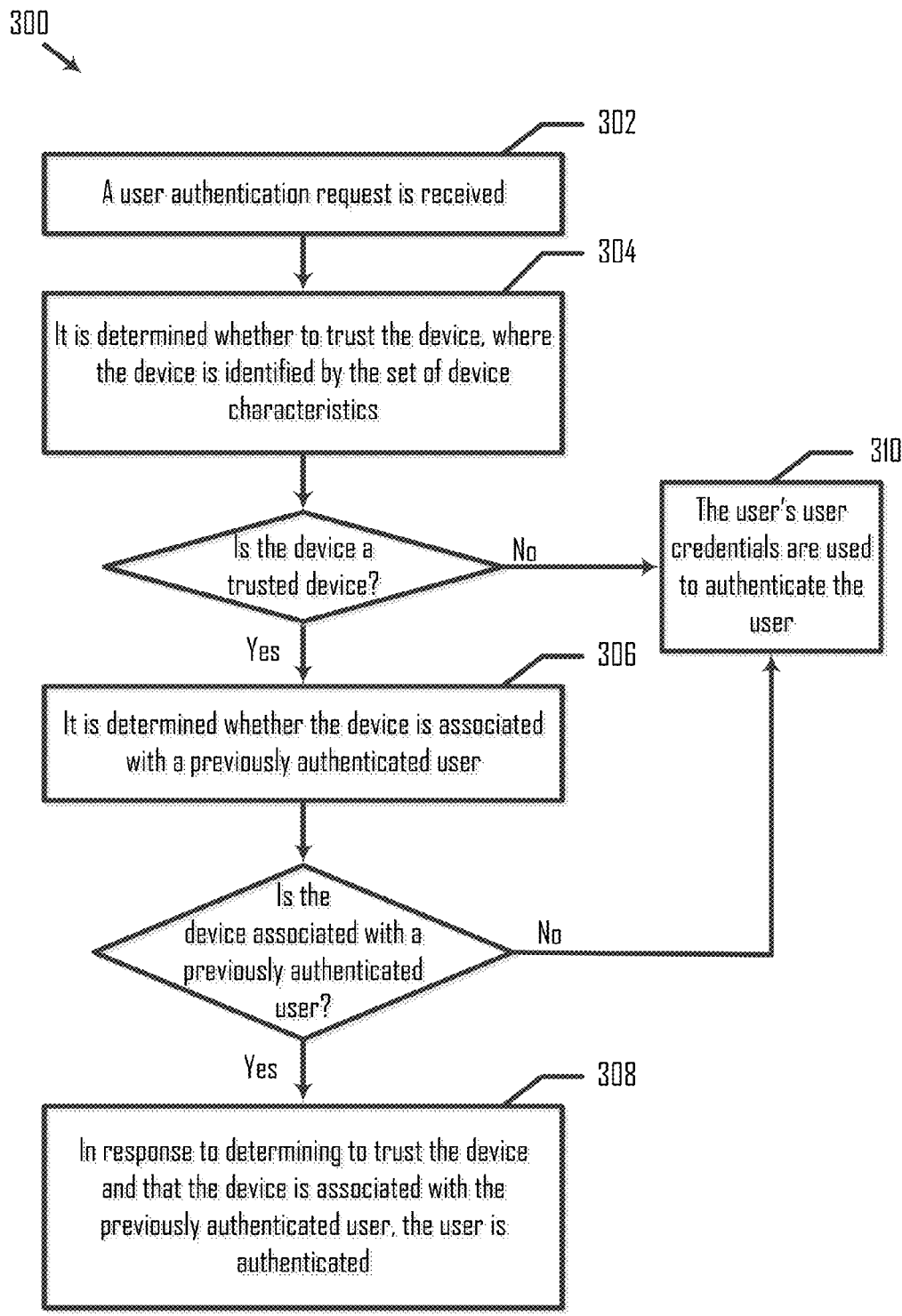
FIGS. 2A and 2B is a flowchart illustrating an embodiment of a method of authenticating a user.
Figure 2B:
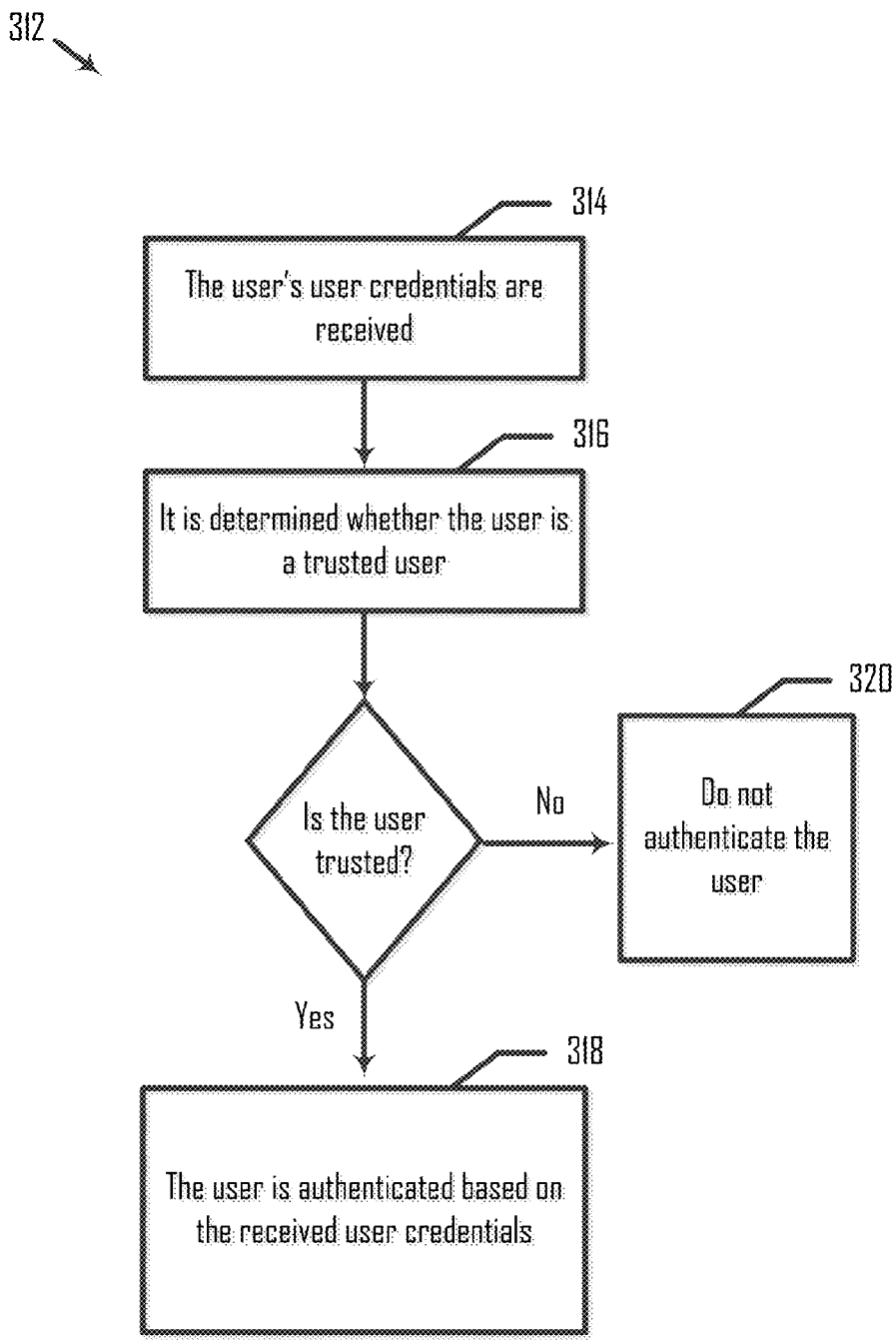

FIGS. 2A and 2B provide a flowchart illustrating an embodiment of a method 300, 312 of authenticating a user. Method 300, 312 is not meant to be limiting and may be used in other applications other than the payment application discussed below. Method 300 includes blocks 302-310 and provides an example process flow of silently authenticating a user following the authentication discussed above. Method 312 includes blocks 314-320 and provides an example process flow of explicitly authenticating a user.

In FIG. 2A, in a block 302, a user authentication request is received. In an example, the SDK executing on the user device sends the user authentication request to the payment provider server, and the payment provider server receives the user authentication request. The user authentication request may include the set of device characteristics discussed above. The payment provider server may identify, based on the set of device characteristics, the user device that sent the user authentication request.

In a block 304, it is determined whether to trust the device, where the device is identified by the set of device characteristics. In an example, the payment provider server determines whether to trust the user device based on the set of received device characteristics. The payment provider server may include a device authenticator. In an example, the device authenticator determines a trustworthiness level of the user device and compares the trustworthiness level to a threshold level. In response to determining that the trustworthiness level satisfies the threshold level, the device authenticator may determine that the user device is trustworthy. In contrast, in response to determining that the trustworthiness level does not satisfy the threshold level, the device authenticator may determine that the user device is not trustworthy.

Figure 3:
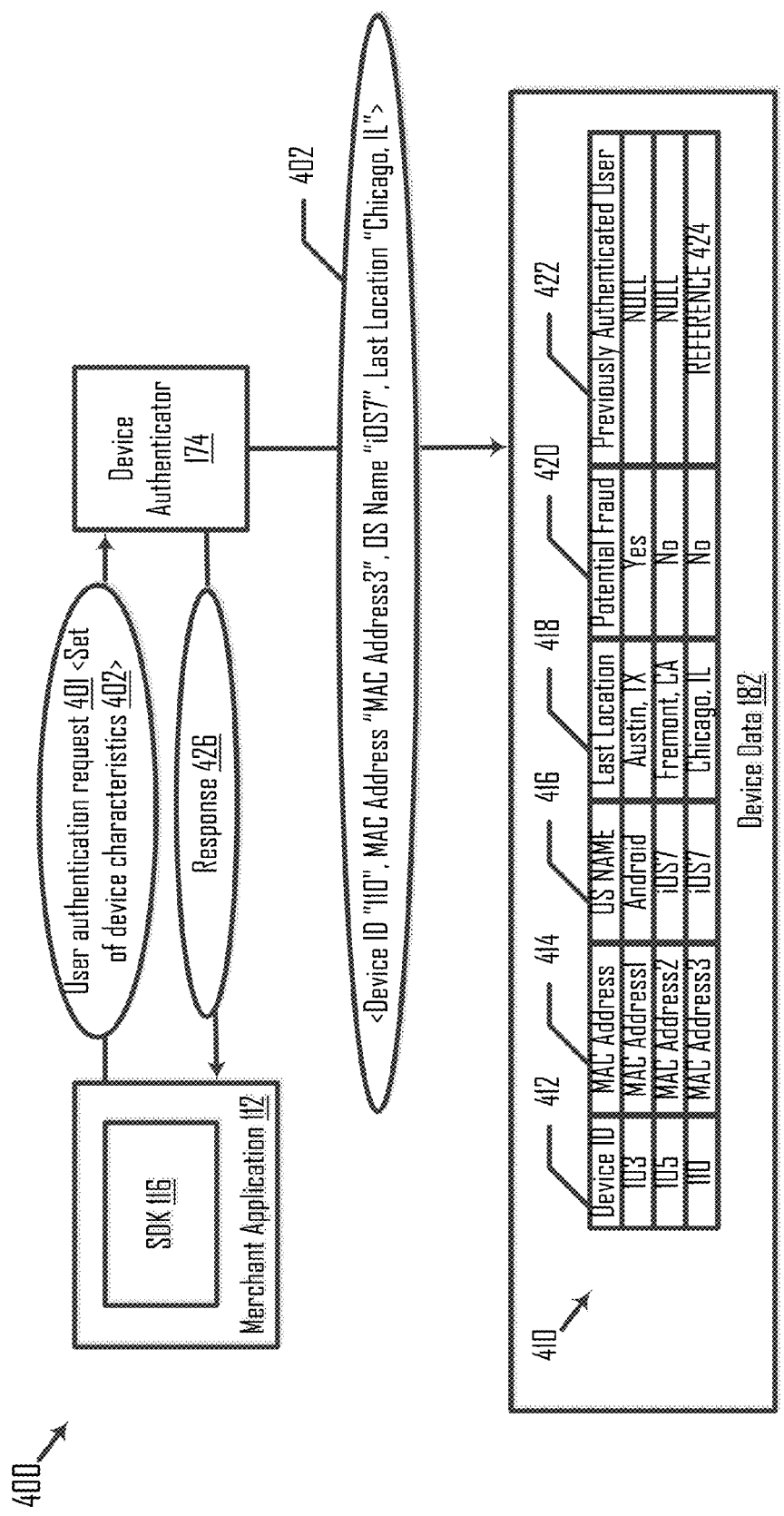
FIG. 3 is a block diagram of an embodiment of a process flow for determining whether a device can be trusted.

FIG. 3 is a block diagram of an embodiment of the process flow 400 for determining whether a device can be trusted. In FIG. 3, the user may select a merchant application, which may interact with the payment provider server via the SDK. The SDK may send a user authentication request 401, for example, in response to the user selecting the merchant application. In an example, user authentication request 401 includes set of device characteristics 402 extracted from the user device and is sent to the payment provider server.

The payment provider server may receive user authentication request 401 and determine whether to authenticate the user of the user device. The user may be silently authenticated or explicitly authenticated. In an example, the payment provider server receives user authentication request 401 and performs actions to determine whether to trust the user device. The device authenticator receives user authentication request 401 and identifies the device based on set of device characteristics 402 included in user authentication request 401. In such an example, the device authenticator may determine whether information about the device is stored in a payment database. The payment database may store device data 182.

Device data 182 includes a device characteristics table 410 that includes a column "Device ID" 412, column "MAC (media access control) address" 414, column "OS Name" 416, column "Last Location" 418, column "Potential Fraud" 420, and column "Previously Authenticated User" 422. Each entry in device characteristics table 410 includes an association between a device ID, a MAC address, an OS executing in the associated device, a last location of the associated device, whether the device may be associated with fraud, and whether the device is associated with a previously authenticated user.

Column "Device ID" 412 may store a unique identifier that identifies a user device that is attempting to access a service provided by the payment provider server. The device ID may be a unique number that the payment service provider generates to ensure that each device attempting to access services provided by the payment service provider is uniquely identified. Column "MAC address" 414 stores the MAC address of the user device identified by the associated device ID. Column "OS Name" 416 stores the name of the OS executing on the user device identified by the associated device ID. Column "Last Location" 418 stores the last geographic location of the device when it sent user authentication request 401.

Column "Potential Fraud" 420 stores information on whether the device is associated with fraud. If the device is associated with fraud, the device may be unsafe to use and the device authenticator may determine that the device should not be trusted. In contrast, if the device is not associated with fraud, the device may be safe to use and the device authenticator may determine that the device should be trusted.

In the example device characteristics table 410 illustrated in FIG. 3, payment provider server 170 has flagged some suspicious activity from a device identified by device ID "103" in the first entry of device characteristics table 410. In such an example, the payment provider server may determine that the user associated with device ID "103" has never made a purchase in Hong Kong and the last attempted purchase made by the device was in Hong Kong. Accordingly, the payment provider server may flag the device as being associated with fraud and thus, unsafe. The payment provider server may send an email to the user of device ID "103" to confirm that the user was in Hong Kong and attempted to make a purchase while in Hong Kong. If the user of device ID "103" confirms that they did attempt to make a purchase while in Hong Kong, the payment provider server may mark device ID "103" as not being associated with fraud. For example, the payment provider server may change "Yes" in column "Potential Fraud" 420 to "No".

Column "Previously Authenticated User" 422 indicates whether the device is associated with a previously authenticated user. A device may be associated with a previously authenticated user if a user has logged into the payment provider server using the device, and the payment provider server authenticated the user. In contrast, a device may not be associated with a previously authenticated user if a user has not used the device to login into the payment provider server yet, where the device includes the SDK. The columns illustrated in device characteristics table 410 are not intended to be limiting, and device characteristics table 410 may include more and/or different columns.

In response to determining that device characteristics table 410 does not store information about the user device, the device authenticator may store set of device characteristics 402 in device data 182. Device characteristics table 410 may not store information about the user device because, for example, this is the first time that the user is using the user device to access a service provided by the payment provider server via the SDK. In the example illustrated in FIG. 3, set of device characteristics 402 includes "<Device ID"110", MAC Address "MAC Address3", OS Name "iOS7", Last Location "Chicago, Ill.">" and is stored in device characteristics table 410. Additionally, the device authenticator may store the default values in columns "Potential Fraud" 420 and "Previously Authenticated User" 422. In an example, the default value for "Potential Fraud" 420 is "No" and the default value for column "Previously Authenticated User" 422 is "NULL".

The device authenticator determines whether the user device is a trusted device. In an example, the device authenticator determines, based on column "Potential Fraud" 420, whether to trust the user device. In such an example, in response to determining that column "Potential Fraud" 420 indicates that the user device is associated with fraud, the device authenticator may determine that the user device is not a trusted device. As such, the device authenticator determines to not trust the user device. The payment provider server may send a response 426 indicating that the user device is not a trusted device to the user device.

In contrast, in response to determining that column "Potential Fraud" 420 indicates that the user device is not associated with fraud, the device authenticator may determine that the user device is a trusted device. As such, the device authenticator determines to trust the user device. The payment provider server may send response 426 indicating that the user device is a trusted device to the user device.

Response 426 is responsive to user authentication request 401 and is described in detail further below. In an example, the SDK receives response 426 and determines, based on response 426, whether the user has been authenticated.

2. Establish Trust with the User

The user authenticator may explicitly or silently authenticate the user. Explicit authentication may refer to providing the user with an authenticated login session based on the user providing his/her user credentials in the same login session as the authenticated login session. Silent authentication may refer to authenticating the user without requesting the user's user credentials in the same login session as the provided authenticated login session.

a. Silent Authentication

In response to the device authenticator determining that the user device is a trusted device, the user authenticator may attempt to silently authenticate the user. In an example, rather than the SDK prompting the user to provide his/her user credentials and sending them to the payment provider server to authenticate the user, the user authenticator may authenticate the user based on whether the device is a trusted device and whether the device is associated with a previously authenticated user.

In FIG. 2A, in a block 306, if the device is a trusted device, it is determined whether the device is associated with a previously authenticated user. In an example, in response to determining to trust the user device, the user authenticator determines whether the user device is associated with a previously authenticated user. In a block 308, if the device is a trusted device and is associated with a previously authenticated user, the user is authenticated. In an example, in response to determining to trust the user device and that the user device is associated with a previously authenticated user, the user authenticator authenticates the user. In such an example, the user is not prompted to enter his/her user credentials to access services of the payment provider server, and the user is authenticated without the need to enter conventional credentials. Rather, the user authenticator authenticates the user based on the user device being a trusted device and being associated with a previously authenticated user.

In the example illustrated in FIG. 3, the first two entries in column "Previously Authenticated User" 422 of device characteristics table 410 are NULL, indicating that the devices associated with device IDs "103" and "105" have not been associated with a previously authenticated user. In such an example, a user may have downloaded or selected a mobile application on a mobile device and the SDK incorporated in the mobile application may have extracted a set of device characteristics from the mobile device and sent them to the payment provider server, which did not authenticate the user. In contrast, the third entry in column "Previously Authenticated User" 422 of device characteristics table 410 stores a reference 424, indicating that the device associated with device ID "110" has been associated with a previously authenticated user. In such an example, a user may have downloaded or selected a mobile application on a mobile device and the SDK incorporated in the mobile application may have extracted a set of device characteristics from the mobile device and sent them to the payment provider server, which authenticated the user. The payment provider server may store an association between the device and the authenticated user in the payment database.

Figure 4:
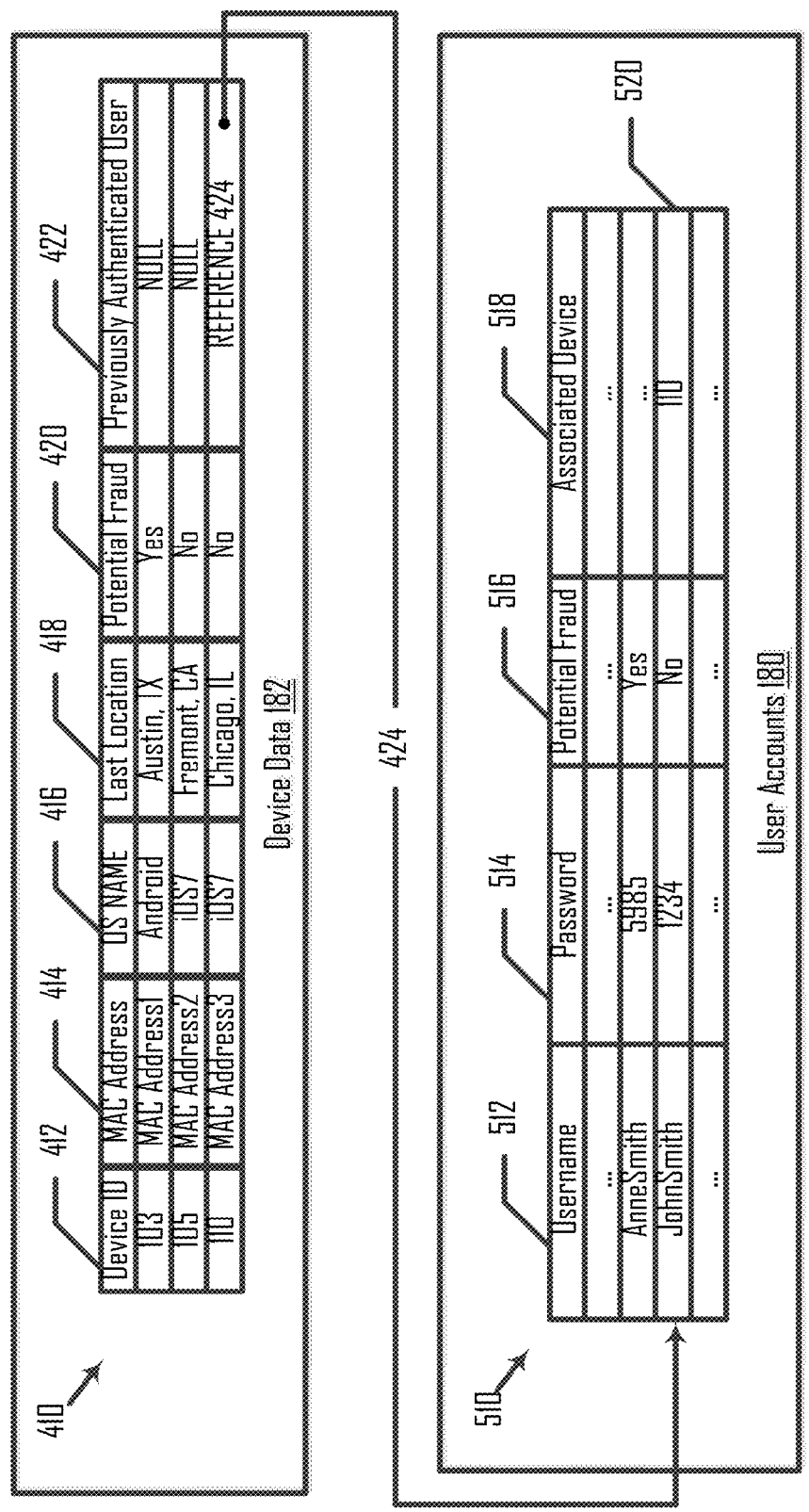
FIG. 4 is an illustration of an embodiment of a database including a record storing information about a previously authenticated user.

FIG. 4 is an illustration of an embodiment of an association between the device and the authenticated user. In the example illustrated in FIG. 4, a reference 424 in device data 182 references a record that is in user accounts 180 and that stores information about a previously authenticated user. Reference 424 is stored in an entry in device characteristics table 410 and references data in user accounts 180. User accounts 180 includes a user information table 510 that includes a column "Username" 512, column "Password" 514, column "Potential Fraud" 516, and column "Associated Device" 518. Each entry in user information table 510 includes an association between a username, password, potential fraud, and whether the user is associated with a device. The columns illustrated in user information table 510 are not intended to be limiting, and user information table 510 may include more and/or different columns.

At an entry 520 in user information table 510, user credentials includes the username "JohnSmith" and password "1234". Accordingly, a user has previously submitted the username "JohnSmith" and password "1234" and has been previously authenticated. Additionally, the user device is a trusted device and is associated with a previously authenticated user. As such, the user authenticator may silently authenticate the user. As such, the user authenticator provides an authenticated session to the user. In an example, the user authenticator sends response 426, where the response includes an authentication token that allows the user to access services provided by the payment provider server. The authentication token may be used to make calls to the payment provider server's APIs.

In response to the user authenticator authenticating the login session, the user may be allowed to use the payment provider server to facilitate the purchase of goods or services, communicate/display information, and send payments by the user of the user device via the merchant application.

The payment provider server may silently authenticate the user based on whether the user device is trusted and whether the user device is associated with a previously authenticated user. The systems and methods of the present disclosure may make it unnecessary for the user to have launched or otherwise used a particular application in order to be silently authenticated for that particular application. In an example, the user's user device may include a car service application such as, for example, the Uber® application available from Uber, Inc. of San Francisco Calif., and a restaurant application such as, for example, the McDonald's® application available from McDonalds of Oak Brook, Ill., and both applications may include or being functional with the SDK provided by the payment provider. In embodiment, the user may launch the Uber® application to pay for a ride provided by a car service. In response, the SDK incorporated in or functional with the Uber® application may automatically send a user authentication request to the payment provider server without receiving user credentials from the user, and the payment provider server may then perform the actions in FIGS. 3A and 3B in order to attempt to silently authenticate the user. The payment provider server may determine whether the user device is trusted and whether the user device is associated with a previously authenticated user. If the user device is trusted and the user device is associated with a previously authenticated user, the payment provider server may silently authenticate the user. As such, the user is not prompted to enter his/her user credentials in order to pay for the transaction with the Uber® application. Rather, the user merely launches the Uber® application, is silently authenticated, and is able to immediately use the Uber® application to pay for their car service.

Following the user of the Uber® application, the user may order food at McDonalds. The user may launch the McDonalds® application installed on the user device in order to pay for the food. In response, the SDK incorporated in or functional with the McDonalds® application may send a user authentication request to the payment provider server without receiving user credentials from the user, and the payment provider server may then perform the actions in FIGS. 3A and 3B in order to attempt to silently authenticate the user. The payment provider server may determine whether the user device is trusted and whether the user device is associated with a previously authenticated user. If the user device is trusted and the user device is associated with a previously authenticated user, the payment provider server may silently authenticate the user. As such, the user is not prompted to enter his/her user credentials in order to pay for the transaction with the McDonalds® application. Rather, the user merely launches the McDonalds® application, is silently authenticated, and is able to immediately use the McDonalds® application to pay for his/her food.

In the conventional process, when launching the merchant application on the user device, the user must either provides user credentials (email/password or phone/pin) or create a new user account to login into the payment provider server. In an embodiment, having successfully authenticated once on the user device, the user device may then be associated with the previously authenticated user. The SDK may ask the user whether they want to be remembered on the device. If the user confirms that they want to be remembered on the device, the payment provider server may then store an association between the user device and the authenticated user in order to silently authenticate the user at a later point in time as discussed above. If the user confirms that they do not want to be remembered on the device, the payment provider server may avoid storing the association between the user device and the authenticated user.

An advantage of silently authenticating the user may provide a convenience to the user because it is unnecessary for the user to enter his/her user credentials each time the user accesses the merchant application. Rather, the user may enter his/her user credentials one time and the SDK may send the user credentials to the payment provider server to store in the payment database. After the first login in which the user uses the user device (e.g., to access services provided by the payment provider server) and is authenticated based on the user's user credentials, the payment provider server may use that data to recreate the user's login session the next time the user uses the user device to login into the payment provider server via any application that incorporates or is functional with the SDK provided by the payment service provider.

Additionally, the user's authentication may be on a per-device basis rather than a per-mobile application basis. The user typically may have to login to the payment account, e.g., PayPal®, multiple times in order to make purchases across several merchant applications on the user device. With the silent authentication, the user may have the option of remaining logged in (or being automatically logged in) to PayPal® and is allowed to shop and pay merchants using the payment application for a certain amount of time before the user has to authenticate again. This means the user may select multiple merchant applications (e.g., the Uber® application and the McDonalds® application provided in the example above) and not have to conventionally manually login to each of those applications following a previous login. In an example, the SDK may provide a prompt requesting whether the use would like to opt into silent authentication. In such an example, if the user opts into silent authentication, the SDK may receive a request from the user to opt into silent authentication. Silent authentication enables the user to be authenticated based on a previous user authentication and whether the device being used by the user is trusted.

Accordingly, if the user device has another merchant application that incorporates or is otherwise functional with the SDK from the payment service provider, and the user selects the other merchant application using the user device, the user authenticator may silently authenticate the user based on whether the user device is a trusted device and whether the user device is associated with a previously authenticated user. Accordingly, it may be unnecessary for the user to enter his/her user credentials to be authenticated and use the services of the payment provider server in relation to any other merchant application on the user device that incorporates or otherwise is functional with the SDK.

2. Explicit Authentication

In a block 310, if the device is not a trusted device, the user's user credentials are used to authenticate the user. In an example, in response to determining to not trust the user device, the user authenticator uses the user's user credentials to authenticate the user.

Additionally, if the device is a trusted device but is not associated with a previously authenticated user, the user's user credentials are used to authenticate the user. In an example, in response to determining to trust the user device and that the user device is not associated with a previously authenticated user, the user authenticator uses the user's user credentials to authenticate the user.

In FIG. 2B, in a block 314, the user's user credentials are received. In an example, the user authenticator receives the user's user credentials. Referring to FIG. 3, if user device 110 is not a trusted device, response 426 may indicate that the user device is not a trusted device or that the user has not been authenticated. Response 426 may include a request for the user's user credentials. The SDK may receive response 426 and prompt the user to provider his/her user credentials. The SDK may receive the user's user credentials and send them to the payment provider server to authenticate the user.

Referring back to FIG. 2B, in a block 316, it is determined whether the user is a trusted user. In an example, the user enters his/her user credentials, and the user authenticator determines whether the user is a trusted user based on the received user credentials. The user authenticator may search user accounts 180 for the received user credentials. In response to determining that user credentials 402 are stored in user information table 410 and that column "Potential Fraud" 320 indicates that user 105 is safe, user authenticator 176 makes the determination to trust user 105. If column "Potential Fraud" 516 includes "No," user authenticator 176 may determine that the user is safe.

In contrast, in response to determining that user credentials 402 are not stored in user information table 410 and/or that the user is unsafe, the user authenticator makes the determination to not trust the user. If column "Potential Fraud" 516 includes "Yes," the user authenticator may determine that the user is unsafe. The user authenticator sends a response 426 to the SDK, where the response is based on whether the user has been authenticated. The SDK receives response 426 and determines, based on response 426, whether to trust the user.

In a block 318, if the user is determined to be a trusted user, the user is authenticated based on the received user credentials from block 314. In an example, in response to determining to trust the user, the user authenticator authenticates the user based on the user credentials. As such, the user authenticator provides an authenticated session to the user. In an example, the user authenticator sends response 426, where the response includes an authentication token that allows the user to access services provided by the payment provider server. The authentication token may be used to make calls to the payment provider server's APIs.

In a block 320, if the user is determined to not be a trusted user, the user is not authenticated. In an example, in response to determining to not trust the user, the user authenticator does not authenticate the user. As such, the user authenticator does not provide an authenticated session to the user. In an example, the user authenticator sends response 426 to the user device, where the response indicates that the user has not been authenticated. In such an example, the SDK may receive response 426, prompt the user again to enter his/her user credentials, and send them to the payment provider server. If the user has entered his/her user credentials incorrectly a threshold number of times, the payment provider server may lock the user's account until the user verifies that it was the user who had entered the incorrect user credentials the threshold number of times.

It is understood that additional processes may be performed before, during, or after blocks 302-320 discussed above. It is also understood that one or more of the blocks of method 300, 312 described herein may be omitted, combined, or performed in a different sequence as desired.

In an example, the order of blocks 304 and 306 as illustrated in FIG. 2A are switched. In such an example, the user authenticator may determine whether the device is associated with a previously authenticated user. In response to the user authenticator determining that the device is associated with a previously authenticated user, the device authenticator may determine whether the device is a trusted device.

In another example, the SDK and the payment provider server send different messages to each other than that described above. For example, the SDK may send a device authentication request to the payment provider server, which determines whether the device is a trusted device. The payment provider server may send a response indicating whether the device is a trusted device to the user device. In response to receiving a response that indicates that the device is a trusted device, the SDK may send an association request that requests whether the trusted device is associated with a previously authenticated user. The payment provider server may send a response indicating whether the trusted device is associated with a previously authenticated user. In response to receiving a response that indicates that the trusted device is associated with a previously authenticated user, the payment provider server may send an authentication token to the SDK and provide the user with an authenticated session.

In another example, the payment provider server may authenticate the user based on whether information about the user device is stored in device data 180 and whether the user device is associated with a previously authenticated user. In such an example, it may be unnecessary for the payment provider server to determine whether the user device is trusted (e.g., associated with fraud) or whether the user is trusted (e.g., associated with fraud). Rather, the payment provider server may determine whether a record exists in device data 182 for the user device and whether a record exists in user accounts 180 for the user.

In another example, the payment provider server silently authenticates the user for a period of time. For example, the payment provider server may store the association between the user device and the user for a period of time. In such an example, in response to the period of time elapsing, the payment provider server may cease to silently authenticate the user and request that the user enter his/her user credentials. After authenticating the user, the payment provider server may store an association between the user device and the previously authenticated user.

Additionally, although the authentication may be described as occurring in the SDK, this is not intended to be limiting. In another example, the authentication may occur in a third-party application (e.g., Paypal® or Venmo®).

III. Example System Architecture

Figure 5:
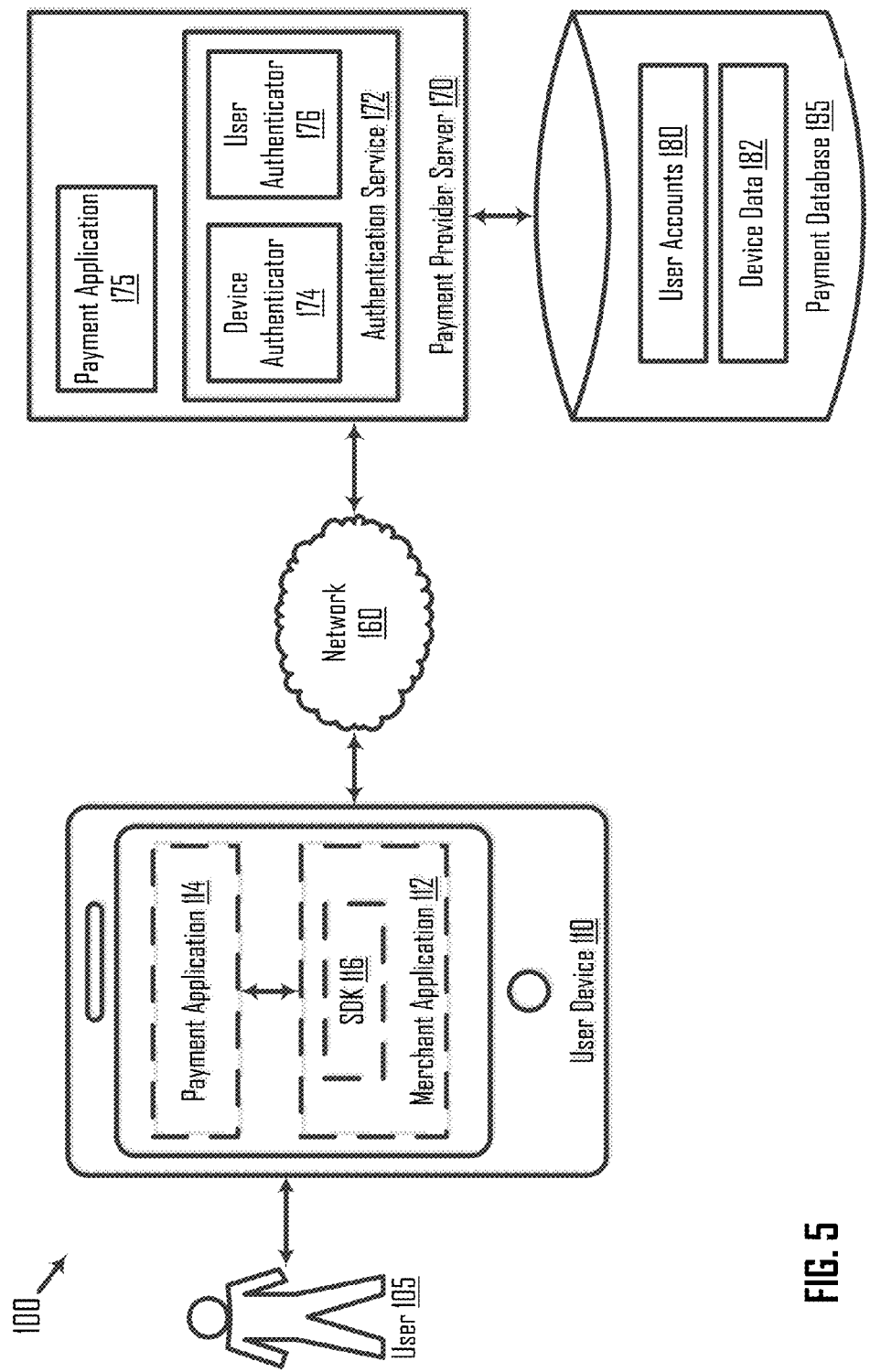
FIG. 5 is a block diagram of an embodiment of a networked system configured to implement a process for silently authenticating a user using a computing device.

FIG. 5 is a block diagram of an embodiment of a networked system 100 configured to implement a process for silently authenticating a user using a computing device. Networked system 100 may include or implement a plurality of servers and/or software components that operate to perform various payment transactions or processes. Exemplary servers may include, for example, stand-alone and enterprise-class servers operating a server operating system (OS) such as a MICROSOFT® OS, a UNIX® OS, a LINUX® OS, or other suitable server-based OS. It can be appreciated that the server illustrated in FIG. 5 may be deployed in other ways and that the operations performed and/or the services provided by such a server may be combined or separated for a given implementation and may be performed by a greater number of servers. One or more servers may be operated and/or maintained by the same or different entities.

System 100 includes a user device 110 and a payment provider server 170 in communication over a network 160. Payment provider server 170 may be maintained by a payment service provider, such as PayPal®, Inc. of San Jose, Calif. User device 110 and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks. Payment provider server 170 may be referred to as a server that is remote from user device 110.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ from Apple™ or an Android smartphone. Trademarks are the property of their respective owners.

User 105 may be a consumer and may use user device 110 to perform an electronic transaction using payment provider server 170. In an example, user 105 uses user device 110 to initiate a payment transaction, receive a transaction approval request, and/or reply to the request. Note that transaction, as used herein, refers to any suitable action performed using the user device, including payments, transfer of information, display of information, etc.

User device 110 may be a mobile device, and a user 105 may download one or more mobile applications onto the mobile device. In an example, user device 110 is an Android® device that is installed with the Android mobile operating system. A mobile application is a software program that may be downloaded and accessed directly via the mobile device. A mobile application may be represented by an icon on a display of user device 110, and user 105 may select the mobile application by touching the icon (e.g., double tapping the icon) to access and interact with the mobile application.

In the example illustrated in FIG. 5, a merchant application 112 and a payment application 114 are installed on user device 110. User 105 may have downloaded these applications on user device 110 or may have received these applications already downloaded on user device 110. Merchant application 112 includes a software development kit (SDK) 116. The payment service provider may provide payment application 114 to facilitate payment processes. In an example, payment application 114 allows user 105 to send payment transaction requests to payment service provider 170. Payment provider server 170 may be maintained, for example, by an online payment service provider that provides payment between user 105 and the merchant that maintains merchant application 112. In this regard, payment provider server 170 may include one or more payment applications 175 that may be configured to interact with user device 110 and/or a merchant that maintains merchant application 112 over network 160 to facilitate the purchase of goods or services, communicate/display information, and send payments by user 105 of user device 110 to a third-party (e.g., the merchant).

Merchant application 112 may be maintained, for example, by a merchant or seller offering various products and/or services. The merchant may be a participating merchant who has a merchant account with the payment service provider. Generally, merchant server 140 may be maintained by anyone or any entity that receives money, which includes charities as well as retailers and restaurants. For example, a purchase transaction may be a donation to charity.

Although user device 110 is illustrated as including two mobile applications, this is not intended to be limiting and user device 110 may include more than two mobile applications. For example, user device 110 may include another merchant application that also includes SDK 116. In another example, user device 110 may include a browser application that is used, for example, to provide a convenient interface to permit user 105 to browse information available over network 160. For example, in one embodiment, the browser application may be implemented as a web browser configured to view information available over the Internet, such as a user account for online shopping and/or merchant sites for viewing and purchasing goods and services. In another example, user device includes a toolbar application that is used, for example, to provide client-side processing for performing desired tasks in response to operations selected by user 105. In one embodiment, the toolbar application may display a user interface in connection with the browser application.

User device 110 also may include other applications to perform functions, such as email, texting, voice and instant messaging (IM) applications that allow user 105 to send and receive emails, calls, and texts through network 160, as well as applications that enable the user to communicate, transfer information, make payments, and otherwise use a smart wallet through the payment provider.

Before user 105 is able to access services provided by payment provider server 170, payment provider server 170 authenticates the user. Payment provider server 170 includes an authentication service 172 that is configured to communicate with user devices to authenticate users. Authentication service 172 includes a user authenticator 176 and a device authenticator 174.

User authenticator 176 authenticates users attempting to access services (e.g., payment application 175) provided by payment provider server 170. User authenticator 176 validates user credentials (may be entered by users) and maintains user accounts 180, which includes information about users, in payment database 195. Payment provider server 170 is coupled to a payment database 195 that includes a plurality of user accounts 180, each of which may include account information associated with consumers, merchants, and funding sources, such as credit card companies. For example, the account information may include private financial information of device users such as account numbers, passwords, device identifiers, user names, phone numbers, credit card information, bank information, or other financial information, which may be used to facilitate online transactions by user 105. The account information may also include user purchase history and user ratings. User authenticator 176 may be further configured to determine the existence of and to manage accounts for user 105, as well as create new accounts.

Device authenticator 174 authenticates devices that are being used by users attempting to access services provided by payment provider server 170. Device authenticator 174 determines whether a device that is attempting to access services provided by payment provider server 170 is trustworthy. Payment provider server 170 is coupled to a payment database 195 that includes device data 182. Device authenticator 174 maintains device data 182, which includes information about user devices, in payment database 195. If a device establishes a communication session with payment provider server 170, device authenticator 174 may search payment database 195 for information about the device and determine whether the device is a trusted device, as will be explained further below. Although user account 180 and device data 182 are illustrated as being stored in payment database 195, this is not intended to be limiting and user account 180 and device data 182 may be stored in separate databases. Additionally, user accounts 180 may span more than one database, and device data 182 may span more than one database.

Payment provider server 170 may provide an authenticated login session to user 105 via user device 110, and user authenticator 176 may explicitly or silently authenticate user 105 to allow the user access to services provided by payment provider server 170. In an example, if user 105 enters his/her user credentials in order to be provided with an authenticated login session and payment provider server 170 authenticates user 105 based on the entered user credentials, the authentication may be referred to as an explicit authentication. In another example, if user 105 is authenticated based on a previous authentication and based on other data (e.g. data that indicates that the device has been previously used by user 105), the authentication may be referred to as a silent authentication. Advantageously, payment application 175 may be configured to interact with SDK 116 on behalf of user 105 during a transaction to silently authenticate the user. User 105 may select merchant application 112, which may interact with payment provider server 170 via SDK 116.

IV. Example Computing Systems

Figure 6:
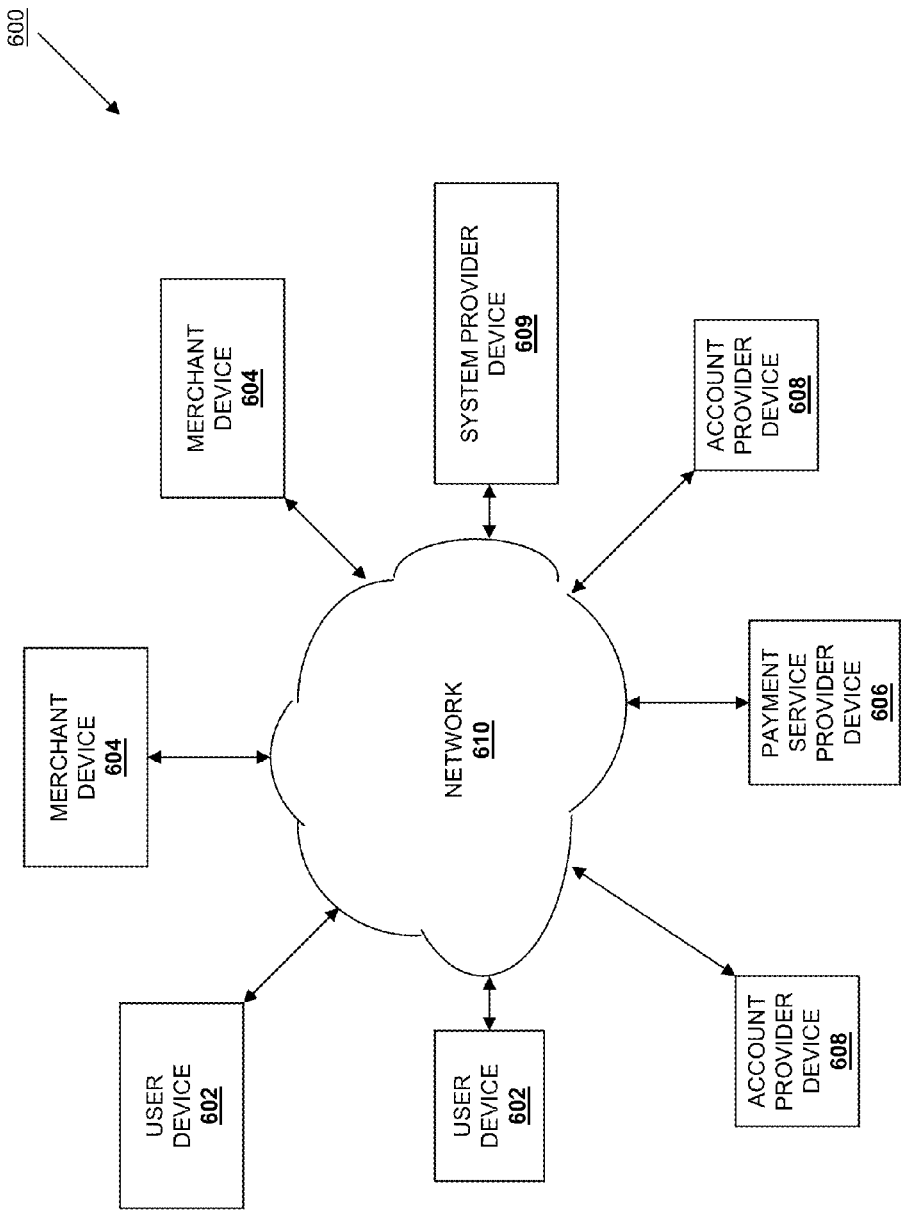
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes a plurality of user devices 602, a plurality of merchant devices 604, a payment service provider device 606, a plurality of account provider devices 608, and/or a system provider device 609 in communication over a network 610. Any of the user devices 602 may be the user devices, discussed above, and may be operated by the users discussed above. The merchant devices 604 may be the merchant devices discussed above and may be operated by the merchants discussed above. The payment service provider device 606 may be the payment service provider devices discussed above and may be operated by a payment service provider such as, for example, PayPal® Inc. of San Jose, Calif. The account provider devices 608 may be the account provider devices discussed above and may be operated by the account providers discussed above such as, for example, credit card account providers, bank account providers, savings account providers, and a variety of other account providers known in the art. The system provider device 609 may be the system provider devices discussed above and may be operated by the system providers discussed above.

The user devices 602, merchant devices 604, payment service provider device 606, account provider devices 608, and/or system provider device 609 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The user devices 602 may be implemented using any appropriate combination of hardware and/or software configured for wired and/or wireless communication over network 610. For example, in one embodiment, the user devices 602 may be implemented as a personal computer of a user in communication with the Internet. In other embodiments, the user devices 602 may be a smart phone, personal digital assistant (PDA), laptop computer, and/or other types of computing devices.

The user devices 602 may include one or more browser applications which may be used, for example, to provide a convenient interface to permit the user to browse information available over the network 610. For example, in one embodiment, the browser application may be implemented as a web browser configured to view information available over the Internet.

The user devices 602 may also include one or more toolbar applications which may be used, for example, to provide user-side processing for performing desired tasks in response to operations selected by the user. In one embodiment, the toolbar application may display a user interface in connection with the browser application.

The user devices 602 may further include other applications as may be desired in particular embodiments to provide desired features to the user devices 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the user to send and receive emails and/or text messages through the network 610. The user devices 602 may include one or more user and/or device identifiers which may be implemented, for example, as operating system registry entries, cookies associated with the browser application, identifiers associated with hardware of the user devices 602, or other appropriate identifiers, such as a phone number. In one embodiment, the user identifier may be used by the payment service provider device 606 and/or account provider devices 608 to associate the user with a particular account as further described herein.

The merchant devices 604 may be maintained, for example, by a conventional or on-line merchant, conventional or digital goods seller, individual seller, and/or application developer offering various products and/or services in exchange for payment to be received conventionally or over the network 610. In this regard, the merchant devices 604 may include a database identifying available products and/or services (e.g., collectively referred to as items) which may be made available for viewing and purchase by the user.

The merchant devices 604 may also include a checkout application which may be configured to facilitate the purchase by the payer of items. The checkout application may be configured to accept payment information from the user through the user devices 602, the account providers through the account provider devices 608, and/or from the payment service provider through the payment service provider device 606 over the network 610.

Figure 7:
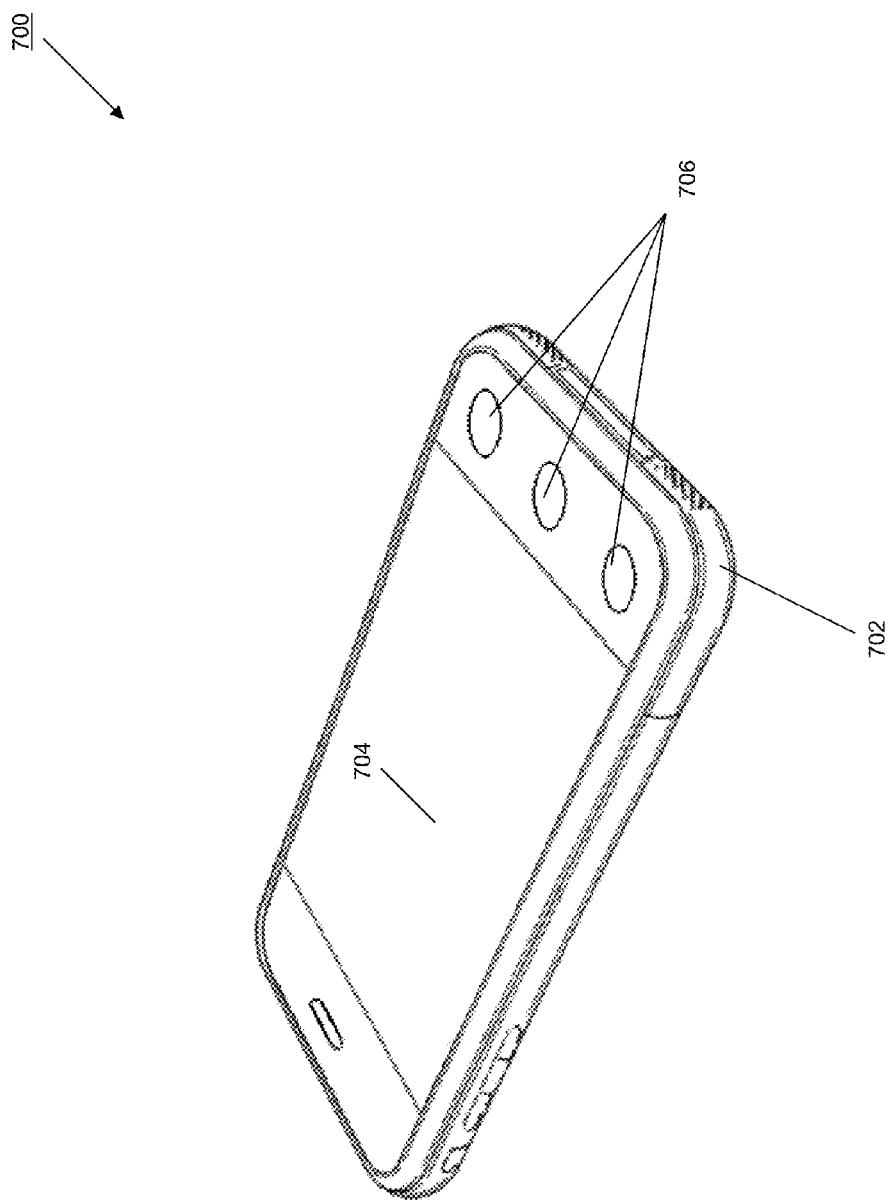
FIG. 7 is a perspective view illustrating an embodiment of a user device.

Referring now to FIG. 7, an embodiment of a user device 700 is illustrated. The user device 700 may be any of the user devices discussed above. The user device 700 includes a chassis 702 having a display 704 and an input device including the display 704 and a plurality of input buttons 706. One of skill in the art will recognize that the user device 700 is a portable or mobile phone including a touch screen input device and a plurality of input buttons that allow the functionality discussed above with reference to the method 100. However, a variety of other portable/mobile user devices and/or desktop user devices may be used in the methods discussed above with reference to FIGS. 1 and 2A and 2B without departing from the scope of the present disclosure.

Figure 8:
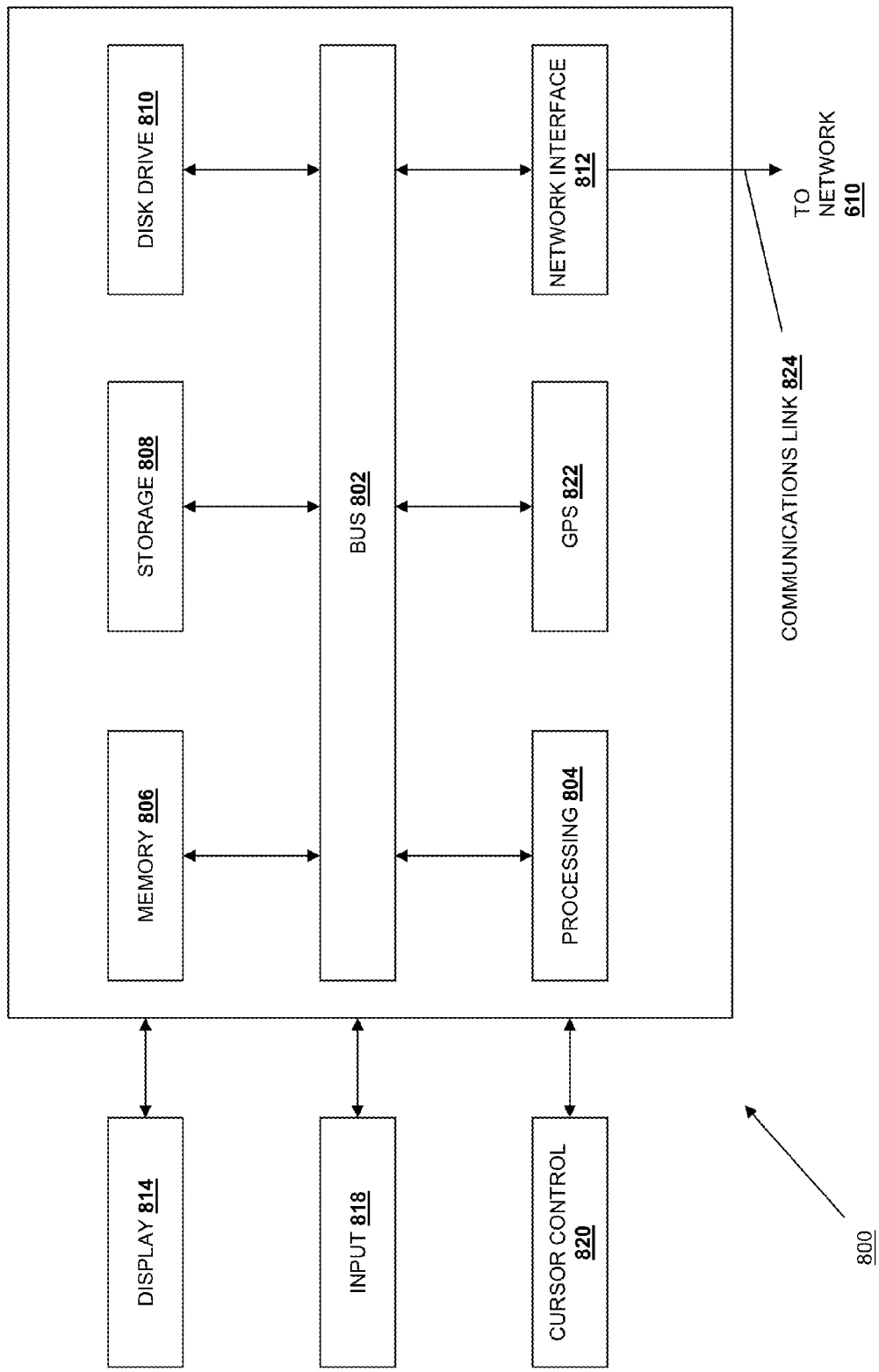
FIG. 8 is a schematic view illustrating an embodiment of a computer system.

Referring now to FIG. 8, an embodiment of a computer system 800 suitable for implementing, for example, the user devices, the merchant devices, the payment service provider device, the account provider devices, and/or the system provider device is illustrated. It should be appreciated that other devices utilized by users, merchants, payment service providers, account providers, and/or system providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user devices, the merchant devices, the payment service provider device, the account provider devices, and/or the system provider device. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
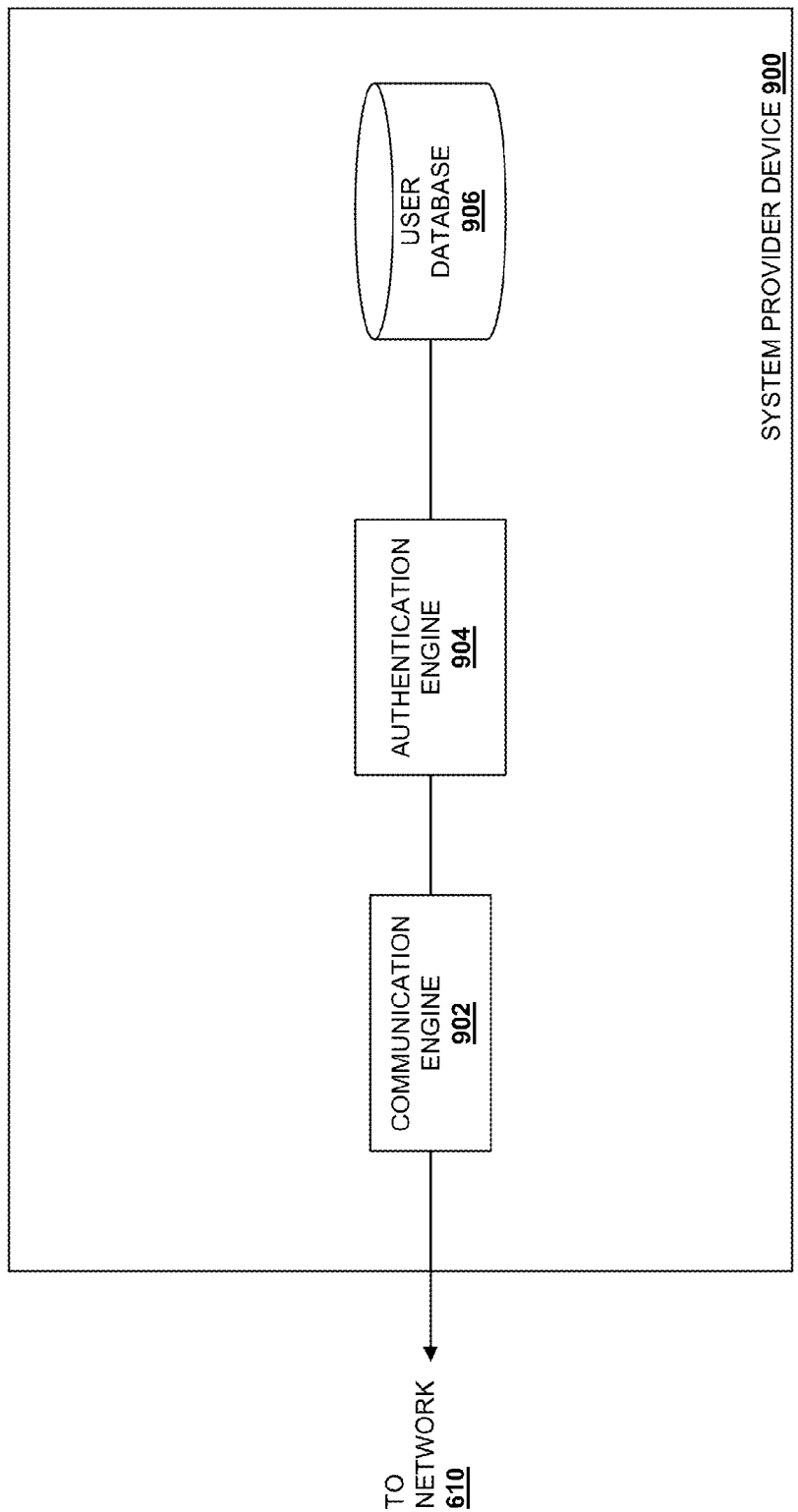
FIG. 9 is a schematic view illustrating an embodiment of a system provider device.

Referring now to FIG. 9, an embodiment of a system provider device 900 is illustrated. In an embodiment, the device 900 may be the user devices, the merchant devices, the payment service provider device, the account provider devices, and/or the system provider device discussed above. The device 900 includes a communication engine 902 that is coupled to the network 610 and to an authentication engine 904 that is coupled to a user database 906. The communication engine 902 may be software or instructions stored on a computer-readable medium that allows the device 900 to send and receive information over the network 610. The authentication engine 904 may be software or instructions stored on a computer-readable medium that is operable to provide any of the other functionality that is discussed above. While the database 906 has been illustrated as located in the device 900, one of skill in the art will recognize that it may be connected to the authentication engine 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

Referring to FIGS. 2A and 2B, an authentication process between user device 110 and payment provider server 170 is illustrated. User device 110 may be an Android mobile device running an Android operating system. A payment application, e.g., PayPal® Mobile Application, may be downloaded from a payment service provider, e.g., PayPal®, Inc., and installed at user device 110. A third-party application, such as merchant application 112, also may be downloaded and installed at user device 110. The third-party application may be enabled with PayPal® mobile SDK.

As shown in FIG. 3, user authentication request 401 may represent payment application 114 and/or merchant application 112 requesting an authenticated token (e.g., an access token) to call the payment service provider. SDK 116 may identify payment provider server 170 and forward the request to payment provider server 170. Payment provider server 170 may authenticate user 105 based on whether user device 110 is a trusted device and is associated with a previously authenticated user.

In some embodiments, information related to whether the device is a trusted device, whether the device is associated with a previously authenticated user, and/or whether the user is a trusted user remains at user device 110. In such embodiments, to prevent security breaches, this information is not sent out to other devices.

What is claimed is:
1. An authentication system, comprising:
a non-transitory memory; and
one or more hardware processors coupled to the non-transitory memory and configured to read instructions from the non-transitory memory to cause the system to perform operations comprising:
 receiving, from a software development kit (SDK) that is operating as a component of a first mobile application that is executing on a user device and that is also provided as a component of a second mobile application that is available on the user device:
  user credentials; and
  a plurality of device characteristics that describe at least one operational feature specific to the user device and at least one contextual feature specific to the user device;
 authenticating access to the first mobile application executing on the user device using the user credentials;
 determining, in response to authenticating access to the first mobile application, that the plurality of device characteristics that were received from the SDK operating as the component of the first mobile application match a plurality of previously stored device characteristics that are stored in a database and that were previously received from the SDK that is provided as the component of one of the first mobile application and the second mobile application;
 associating, in response to both authenticating access to the first mobile application and determining that the plurality of device characteristics that were received from the SDK operating as the component of the first mobile application match a plurality of previously stored device characteristics, a previously authenticated user with the user device in the database;
 receiving, from the SDK that is operating as the component of the second mobile application executing on the user device, the plurality of device characteristics from the user device that describe the at least one operational feature specific to the user device and the at least one contextual feature specific to the user device; and
 authenticating, without receiving user credentials associated with the second mobile application, access to the second mobile application based on:
  the plurality of device characteristics that were received from the SDK operating as the component of the second mobile application matching the plurality of previously stored device characteristics in the database; and
  the user device being associated with a previously authenticated user.

2. The system of claim 1, wherein the operations further comprise:
providing, to the user device in response to authenticating access to the first mobile application, an authentication token, wherein the SDK that is operating as the component of the second mobile application provides the authentication token along with the plurality of device characteristics, and the authenticated access to the second mobile application is also based on the authentication token.

3. The system of claim 1, wherein the SDK provided as the component of one of the first mobile application and the second mobile application is configured to extract the plurality of previously stored device characteristics from the user device in response to the installation of the one of the first mobile application and the second mobile application on the user device, and provide the plurality of previously stored device characteristics for storage in the database.

4. The system of claim 1, wherein the SDK provided as the component of the first mobile application and the second mobile application is executable on the user device by one or more entities corresponding to the first mobile application or the second mobile application.

5. The system of claim 1, wherein the operations further comprise:
extracting, using the SDK provided as the component of the first mobile application and in response to selection of the first mobile application, the plurality of previously stored device characteristics from the user device, wherein the SDK provided as the component of the first mobile application is configured to provide the plurality of previously stored device characteristics for storage in the database.

6. The system of claim 1, wherein the operations further comprise:
extracting, using the SDK provided as the component of the second mobile application and in response to selection of the second mobile application, the plurality of previously stored device characteristics from the user device, wherein the SDK provided as the component of the second mobile application is configured to provide the plurality of previously stored device characteristics for storage in the database.

7. The system of claim 1, wherein the user device is a mobile device.

8. The system of claim 1, wherein the at least one operational feature the plurality of previously stored device characteristics includes an operating system identifier and a Media Access Control (MAC) address utilized by the user device, and the at least one contextual feature in the plurality of device characteristics includes a location of the user device.

9. A method of silently authenticating a user, comprising:
receiving, by a system provider device from a software development kit (SDK) that is operating as a component of a first mobile application that is executing on a user device, and that is also provided as a component of a second mobile application that is available on the user device:
user credentials; and
a plurality of device characteristics that describe at least one operational feature specific to the user device and at least one contextual feature specific to the user device;
authenticating, by the system provider device, access to the first mobile application executing on the user device using the user credentials;
determining, by the system provider device in response to authenticating access to the first mobile application, that the plurality of device characteristics that were received from the SDK operating as the component of the first mobile application match a plurality of previously stored device characteristics that are stored in a database and that were previously received from the SDK that is provided as the component of one of the first mobile application and the second mobile application; and
associating, by the system provider device in response to both authenticating access to the first mobile application and determining that the plurality of device characteristics that were received from the SDK operating as the component of the first mobile application match a plurality of previously stored device characteristics, a previously authenticated user with the user device in the database;
receiving, by the system provider device from the SDK that is operating as the component of the second mobile application executing on the user device, the plurality of device characteristics from the user device that describe the at least one operational feature specific to the user device and the at least one contextual feature specific to the user device; and
authenticating without receiving user credentials associated with the second mobile application, access to the second mobile application based on:
the plurality of device characteristics that were received from the SDK operating as the component of the second mobile application matching the plurality of previously stored device characteristics in the database; and
the user device being associated with a previously authenticated user.

10. The method of claim 9, further including:
receiving, by the system provider device, the plurality of previously stored device characteristics from the SDK provided as the component of one of the first mobile application and the second mobile application in response to the installation of the one of the first mobile application and the second mobile application on the user device.

11. The method of claim 9, further including:
receiving, by the system provider device, the plurality of previously stored device characteristics from the SDK provided as the component of the first mobile application in response to the selection of the first mobile application on the user device.

12. The method of claim 9, further including:
receiving, by the system provider device, the plurality of previously stored device characteristics from the SDK provided as the component of the second mobile application in response to the selection of the second mobile application on the user device.

13. The method of claim 9, wherein the at least one operational feature in the plurality of previously stored device characteristics include an operating system identifier and a Media Access Control (MAC) address utilized by the user device, and the at least one contextual feature in the plurality of device characteristics includes a location of the user device.

14. The method of claim 9, further including:
providing, by the system provider device in response to authenticating access to the first mobile application, wherein the SDK that is operating as the component of the second mobile application provides the authentication token along with the plurality of device characteristics, and the authenticated access to the second mobile application is also based on the authentication token.

15. A non-transitory machine-readable medium comprising a plurality of machine-readable instructions executable to cause a machine to perform operations comprising:
  receiving, from a software development kit (SDK) that is operating as a component of a first mobile application that is executing on a user device and that is also provided as a component of a second mobile applications that is available on the user device;
  user credentials; and
  a plurality of device characteristics that describe at least one operational feature specific to the user device and at least one contextual feature specific to the user device;
  authenticating access to the first mobile application executing on the user device using the user credentials;
  determining, in response to authenticating access to the first mobile application, that the plurality of device characteristics that were received from the SDK operating as the component of the first mobile application match a plurality of previously stored device characteristics that are stored in a database and that were previously received from the SDK that is provided as the component of one of the first mobile application and the second mobile application;
  associating, in response to both authenticating access to the first mobile application and determining that the plurality of device characteristics that were received from the SDK operating as the component of the first mobile application match a plurality of previously stored device characteristics, a previously authenticated user with the user device in the database;
  receiving, from the SDK that is operating as the component of the second mobile application executing on the user device, the plurality of device characteristics from the user device that describe the at least one operational feature specific to the user device and the at least one contextual feature specific to the user device; and
  authenticating, without receiving user credentials associated with the second mobile application, access to the second mobile application based on:
    the plurality set of device characteristics that were received from the SDK operating as the component of the second mobile application matching the plurality of previously stored device characteristics in the database; and
    the user device being associated with a previously authenticated user.

16. The non-transitory machine-readable medium of claim 15, wherein the at least one operational feature in the plurality of previously stored device characteristics includes an operating system identifier and a Media Access Control (MAC) address utilized by the user device, and the at least one contextual feature in the plurality of device characteristics includes a last known location of the user device.

17. The non-transitory machine-readable medium of claim 15, wherein the operations further include:
  receiving a request from the user device to opt into silent authentication, wherein silent authentication enables the user to be authenticated access to the second mobile application based only on:
    the plurality of device characteristics that were received from the SDK operating as the component of the second mobile application matching the plurality of previously stored device characteristics in the database; and
    the user device being associated with a previously authenticated user.

18. The non-transitory machine-readable medium of claim 15, wherein the operations further comprise:
  wherein the SDK provided as the component of the first mobile application and the second mobile application is executable on the user device by one or more entities corresponding to the first mobile application or the second mobile application.

19. The non-transitory machine-readable medium of claim 15, wherein the operations further comprise:
  extracting, using the SDK provided as the component of the first mobile application and in response to selection of the second mobile application, the plurality of previously stored device characteristics from the user device, wherein the SDK provided as the component of the first mobile application is configured to provide the plurality of previously stored device characteristics for storage in the database.

20. The non-transitory machine-readable medium of claim 15, the operations further comprise:
  extracting, using the SDK provided as the component of the second mobile application and in response to a selection of the second mobile application, the plurality of previously stored device characteristics from the user device, wherein the SDK provided as the component of the second mobile application is configured to provide the plurality of previously stored device characteristics for storage in the database.

* * * * *